United States Patent [19]

Zarchy

[11] Patent Number: 4,528,100
[45] Date of Patent: Jul. 9, 1985

[54] PROCESS FOR PRODUCING HIGH YIELD OF GAS TURBINE FUEL FROM RESIDUAL OIL

[75] Inventor: Andrew S. Zarchy, Amawalk, N.Y.

[73] Assignee: General Electric Company, Schenectady, N.Y.

[21] Appl. No.: 547,275

[22] Filed: Oct. 31, 1983

[51] Int. Cl.³ .............................................. C10G 21/06
[52] U.S. Cl. ...................................... 210/634; 208/309
[58] Field of Search ............. 203/49; 208/208 R, 309; 210/511, 634

[56] References Cited

U.S. PATENT DOCUMENTS

| | | | |
|---|---|---|---|
| 3,969,196 | 7/1976 | Zosel | 203/49 |
| 4,125,459 | 11/1978 | Garwin | 208/309 |
| 4,191,639 | 3/1980 | Audeh et al. | 208/309 |
| 4,349,415 | 9/1982 | DeFilippi et al. | 210/634 |
| 4,358,365 | 11/1982 | Hutchings et al. | 208/309 |
| 4,375,387 | 3/1983 | DeFilippi et al. | 210/511 |

Primary Examiner—Richard V. Fisher
Assistant Examiner—W. Gary Jones
Attorney, Agent, or Firm—Lawrence D. Cutter; James C. Davis, Jr.; Marvin Snyder

[57] ABSTRACT

The acceptability of residual oil as a gas turbine fuel is greatly enhanced in a two step process which significantly decreases the vanadium content of the residual fuel. In the process, the residual oil is first broken down into an oil phase and asphaltene phase by either conventional or supercritical extraction. In this step, the majority of vanadium remains in the asphaltene phase. The vanadium is then removed from the asphaltenes by a supercritical solvent extraction process in which the vanadium free asphaltene phase is then re-dissolved in the oil for use as a gas turbine fuel. This fuel possesses significantly lower vanadium content, and thus permits gas turbine operation for greater periods of time without maintenance.

3 Claims, 1 Drawing Figure

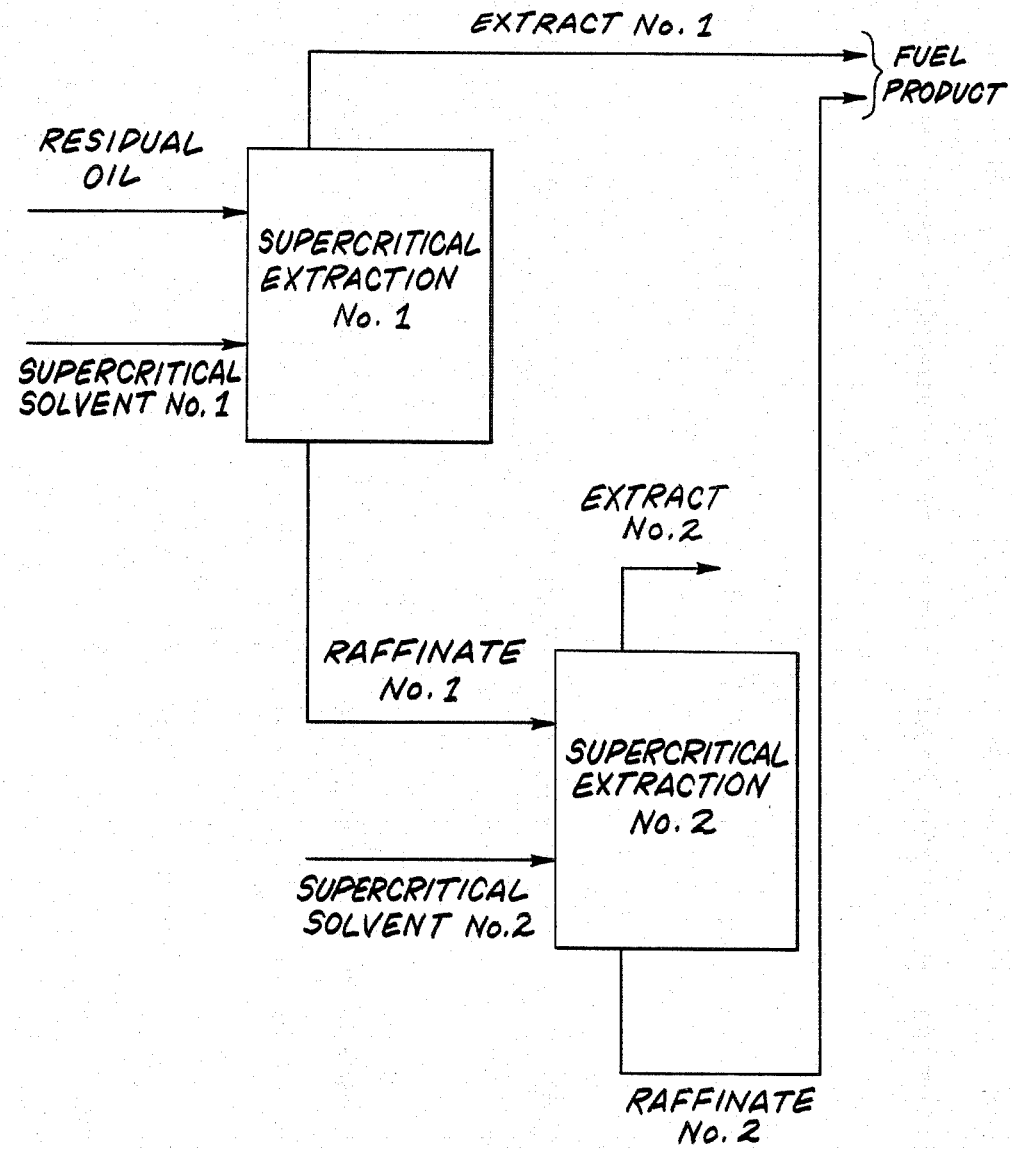

PROCESS FOR PRODUCING HIGH YIELD OF GAS TURBINE FUEL FROM RESIDUAL OIL

BACKGROUND OF THE INVENTION

The present invention is related to processes for the removal of vanadium and/or other contaminants from residual fuel oil. More particularly, the present invention relates to supercritical extraction processes for treating residual fuel oil to achieve a higher performance in gas turbine operation.

Residual oil is the oil that remains after crude oil is distilled. It is not a uniquely characterizable fuel. The composition of the residual oil is a function of both the crude oil from which it was derived and the conditions under which it was prepared. Moreover, determination of the chemical composition of a given residual oil is a difficult task, since it composed of a wide spectrum of compounds. To avoid this characterization problem, it is common in the petroleum industry to describe oil fractions by operational definitions. For example, various fractions obtained in distillation are described by the "still" temperature at which they were drawn. This is also referred to as the "cut" temperature. Similarly, the various fractions of residual oil are described by their solubility in known solvents. In particular, the asphaltenes comprise those crude oil compounds which are not soluble in pentane. It is the treatment of this residual oil which is described herein. More particularly, it is seen below that a first part of the process of the present invention involves separation of residual oil into an oil phase and an asphaltene phase.

However, the use of residual oil in gas turbine plants, particularly gas turbine power generating plants has certain difficulties associated therewith as a result of undesirable contaminants present in the residual oil. Moreover a significant contaminant which is present in residual oil is vanadium. Vanadium is considered a contaminant since it has a highly deleterious effect on gas turbine components. Accordingly, it is desirable that the vanadium be removed from the residual oil before it is employed as fuel for gas turbine plants. At present, the problem of vanadium contamination is solved through the utilization of magnesium injection to reduce the corrosive effects of vanadium in the residual oil. It is also noted that the amount of magnesium added is proportional to the concentration of vanadium in the fuel. However, the use of magnesium as an additive results in the accumulation of ash-like deposits on interior gas turbine parts. This necessitates periodic shut-down and maintenance of the gas turbine to remove the deposits that result, from magnesium injection.

The magnesium additive is included to reduce the corrosive effects of vanadium in the residual oil. Any operation which reduces the vanadium concentration also reduces the amount of magnesium required. If a process were available to reduce the vanadium from the fuel oil, many cost factors associated with residual oil treatment would be eliminated or reduced. The present invention is directed to a process which accomplishes all of those objectives associated with vanadium removal.

The vanadium is chemically bound in some of the organic molecules in the residual oil, and thus is soluble in the oil. Typically, 50% of the vanadium is incorporated in the oil as a porphyrinic structure. The basic porphyrinic structure has a molecular weight of approximately 400, and can exist as monomer or polymer or associate with other forms, and thus can be incorporated into very large structures. Similarly, the non-porphyrinic forms span a very wide range of molecular weights. L. W. Corbett has performed an analysis of the distribution of metals in a typical residual oil ("Distribution of Heavy Metals in Asphalt Residuals", A.C. Symposia, Div. of Pet. Chem., Miami Beach, Apr. 9-12, 1967). The analysis implies that it is possible to separate approximately 70% of the oil containing a very modest amount of vanadium by distillation. Also, 70% of the vanadium is associated with the asphaltenic fraction, which makes up 15% by weight of the oil. By simply deasphalting the oil, a yield of 85% with 70% vanadium removal is possible. In accordance with the present invention, this vanadium removal is achieved by the selective extraction of the vanadium bearing compounds from deasphalted oil through the utilization of supercritical fluid extraction methods.

Supercritical fluid extraction (SCFE) is a chemical engineering unit operation whose applications are rapidly growing. As the name implies, supercritical fluid extraction is an extraction process in which a fluid above its critical point is used as the solvent. Thus SCFE is in a sense, a hybrid between liquid extraction and distillation in that the fluid has the flow properties of a gas, yet the solvent properties of a liquid. Although the principals of SCFE have been known for over 100 years, the operation has only recently begun to elicit interest as its advantages have only recently been recognized. Some of these advantages are that SCFE is frequently more energy efficient, more selective, runs at lower temperatures and can exhibit a larger solubility difference over a narrower range of conditions in either distillation or extraction. The use of SCFE for refining residual oils has been employed in the past as a means to deasphalt oil. For example, supercritical propane has been used as a fluid for such a deasphalting process. See, for example, the article "Compressed Hydrocarbon Gasses as a Solvent" by T. P. Zhuze (Petroleum, London, Volume 23, page 298, 1960). Additionally, C. A. Irani and E. W. Funk in "Separations Using Super Critical Gasses—Recent Developments in Separation Science" (Volume III, Part A, page 171, CRC Press, West Palm Beach, Fla., 1977) have noted that vanadium concentration increases with yield, they conclude that there is no substantial advantage of this process over conventional liquid extraction for solvent deasphalting. However, the objective of the extraction processes described by Zhuze and Irani and Funk are merely directed to deasphalting without regard to vanadium content. In contrast, the present invention is directed to the utilization of solvents and conditions which are particularly directed to vanadium removal.

SUMMARY OF THE INVENTION

In accordance with a preferred embodiment of the present invention, a process for the treatment of residual oil comprises the steps of treating the residual oil so as to produce a first extract and a first raffinate using supercritical solvent extraction with a first supercritical solvent, and then treating the first raffinate so as to produce a second extract and a second raffinate, again by supercritical solvent extraction using a second supercritical solvent and then combining the first extract and the second raffinate to form a product fuel. In accordance with a particular embodiment of the present invention, the supercritical solvents are particularly selected to concentrate vanadium in the second extract.

Accordingly, it is an object of the present invention to provide a process for the removal of vanadium from residual oil.

It is a further object of the present invention to reduce the magnesium injection requirements for gas turbines operating with residual oil as a fuel.

It is also an object of the present invention to provide supercritical fluid extraction processes which are particularly amenable to the selective removal of vanadium from residual oil.

It is a further object of the present invention to provide an efficient yet selective process for the removal of vanadium from residual fuel oil.

DESCRIPTION OF THE FIGURE

The subject matter which is regarded as the invention is particularly pointed out and distinctly claimed in the concluding portion of the specification. The invention, however, both as to organization and method of practice, together with further objects and advantages thereof, may best be understood by reference to the following descriptions taken in connection with the accompanying drawing in which:

The Figure is a schematic diagram illustrating the process of the present invention.

DETAILED DESCRIPTION OF THE INVENTION

The FIGURE illustrates in schematic, flow diagram form the process of the present invention. In particular, it is seen that residual oil together with a first supercritical solvent is applied to a first supercritical extraction reactor. In this extraction process, the residual oil is separated into an oil phase which is removed as extract No. 1, leaving behind an asphaltene raffinate, designated as raffinate No. 1. Supercritical solvent No. 1 preferably comprises carbon dioxide, but other solvents such as hexane, propane and butane may be employed. It is also noted that the first extraction process may also be carried out by conventional processes rather than by supercritical fluid extraction. Conventional processes include distillation and liquid-liquid extraction. In the first extraction step, the oil phase typically comprises between about 80 and 85% by weight of the residual oil feed stream. Additionally, between about 20 and 25% of the vanadium present in the residual oil remains in the first extract. However, as is seen below, this vanadium represents almost all of the vanadium present in the final fuel product. The remaining asphaltene phase comprises between about 15 and 20% by weight of the feed stock and 70 to 85% of the vanadium. This asphaltene phase has a molecular weight of approximately 3,500 and is rather non-volatile. The vanadium in this asphaltene phase is found primarily in the form of vanadyl porphyrins having a molecular weight range of between about 300 and about 500 and is significantly more volatile than the asphaltenes. The vanadium in the asphaltene phase comprises less than 1% by weight of the starting feed stream. As a result of the higher volatility of the vanadyl porphyrins, they are readily extracted by supercritical fluid extraction processes from the solid asphaltene phase (raffinate No. 1). This second supercritical extraction step is carried out in supercritical extraction reactor No. 2 which is supplied with the asphaltene phase together with a second supercritical solvent to produce a second extract and a second raffinate. The vanadium is concentrated in the second extract and the resulting second raffinate is then mixed with the extract of the first SCFE process to form the final fuel product which is significantly lower in vanadium content. In fact, the second SCFE process removes about 99% of the vanadium contained in the first raffinate. The second supercritical solvent preferably comprises carbon dioxide, but may also include such solvents as hexane, propane, butane, etc. It is therefore seen that the final fuel product contains only between about 21 and 26% of the original vanadium.

From the above, it may be appreciated that the process of the present invention provides an energy efficient, highly selective process for the removal of vanadium from residual fuel oil. It is also seen that the vanadium reduction is beneficial in that it reduces the requirements for magnesium injection thus resulting in reduced gas turbine maintenance problems. It is also seen that the process of the present invention is particularly effective in that it employs supercritical solvents which are particularly useful for the selective removal of vanadyl porphyrins from asphaltene raffinates.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A process for the treatment of residual oil comprising the steps of:
    treating a feed supply of said residual oil so as to produce a first extract and a first raffinate by supercritical solvent extraction using a first supercritical solvent;
    treating said first raffinate so as to produce a second extract and a second raffinate by supercritical solvent extraction using a second supercritical solvent, said treatment of said first raffinate operating to concentrate vanadium present in said residual feed supply in said second extract; and
    combining said first extract and said second raffinate.

2. The process of claim 1 in which said first supercritical solvent comprises material selected from the group consisting of carbon dioxide, hexane, propane, pentane and butane.

3. The process of claim 1 in which said second supercritical solvent comprises material selected from the group consisting of carbon dioxide, hexane, propane, pentane and butane.

* * * * *